United States Patent [19]

Moulton

[11] Patent Number: 5,088,788
[45] Date of Patent: Feb. 18, 1992

[54] VEHICLE COVER APPARATUS

[76] Inventor: Lee A. Moulton, 5081 Keane Dr., Carmichael, Calif. 95608

[21] Appl. No.: 673,355

[22] Filed: Mar. 22, 1991

[51] Int. Cl.⁵ .............................................. B60J 7/20
[52] U.S. Cl. .................................. 296/136; 150/166
[58] Field of Search .................. 296/136, 98; 150/166

[56] References Cited

U.S. PATENT DOCUMENTS

| | | | |
|---|---|---|---|
| 1,719,055 | 7/1929 | Herzer | 296/136 |
| 1,918,423 | 7/1933 | Persinger | 296/136 |
| 2,688,513 | 9/1954 | Poirier | 296/136 |
| 4,171,145 | 10/1979 | Pearson, Sr. | 296/78.1 |
| 4,570,986 | 2/1986 | Sams | 293/117 |
| 4,674,782 | 6/1987 | Helber | 293/106 |
| 4,732,421 | 3/1988 | Ross et al. | 296/136 |
| 4,856,842 | 8/1989 | Ross et al. | 296/136 |

FOREIGN PATENT DOCUMENTS 473572 10/1937 United Kingdom ............... 296/136

Primary Examiner—Robert R. Song
Attorney, Agent, or Firm—Thomas R. Lampe

[57] ABSTRACT

Vehicle cover apparatus including a cover for covering the vehicle, a housing for attachment to the vehicle for storing the cover when it is not being used to cover the vehicle, and a closure for the housing which exerts a pulling force on the cover when the cover is on the vehicle to tighten the cover relative to the vehicle.

11 Claims, 5 Drawing Sheets

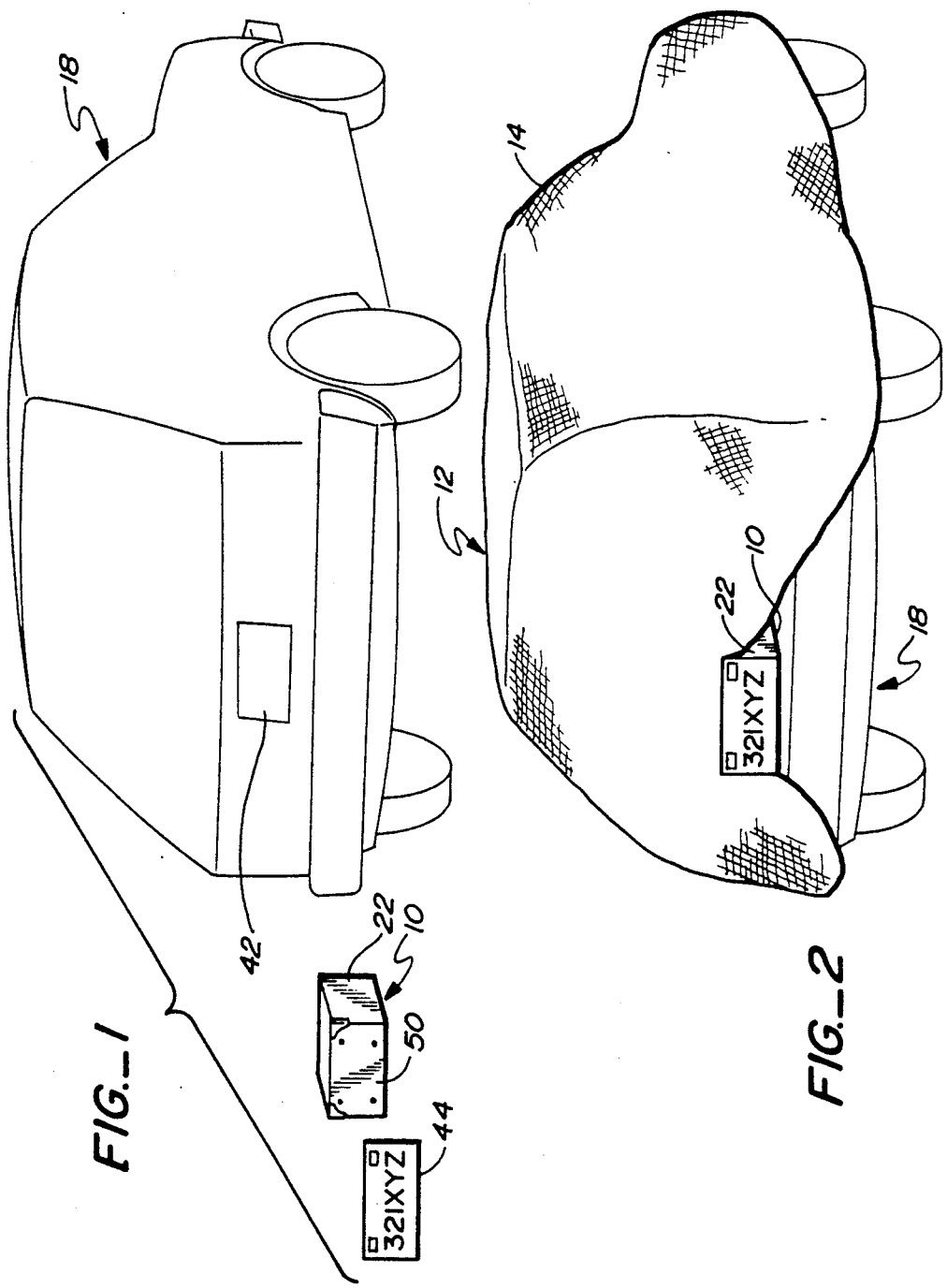

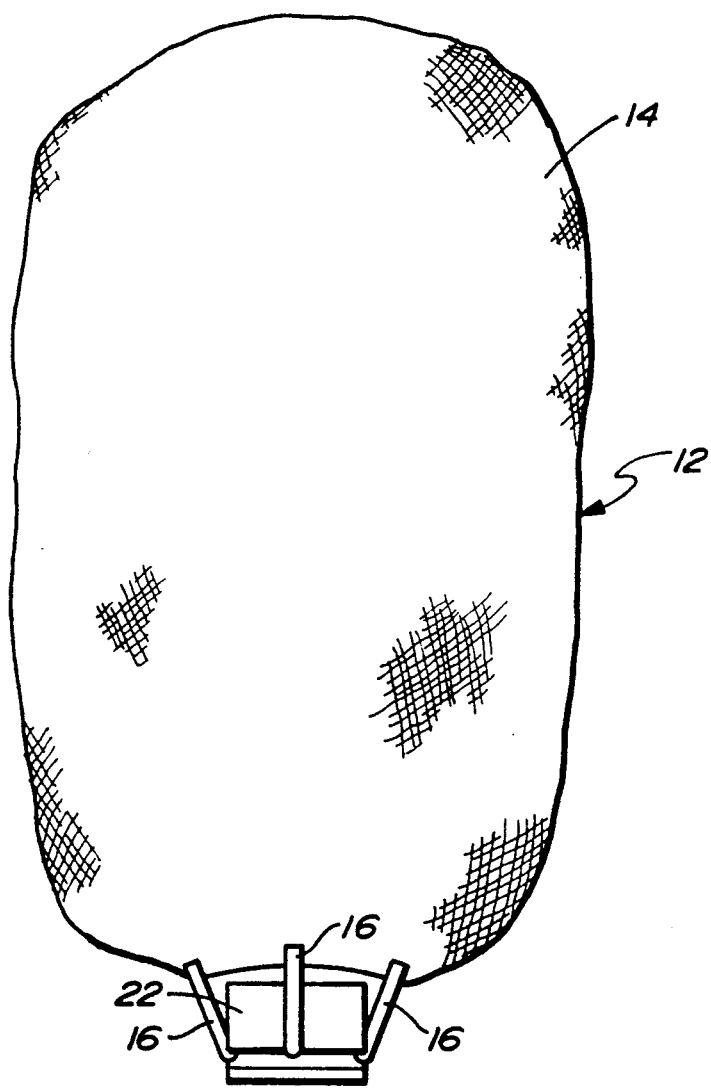
FIG._2A

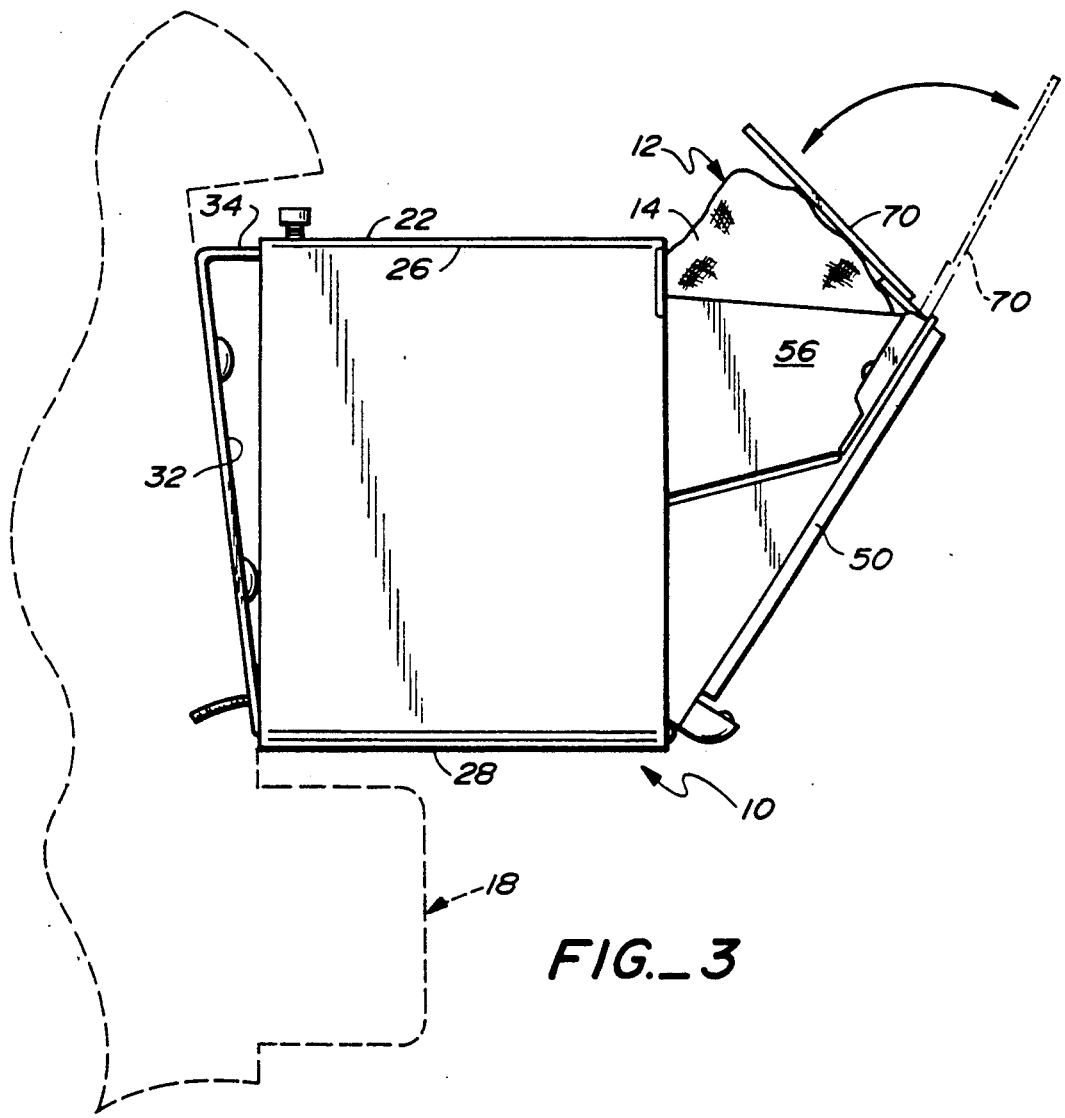
FIG._3

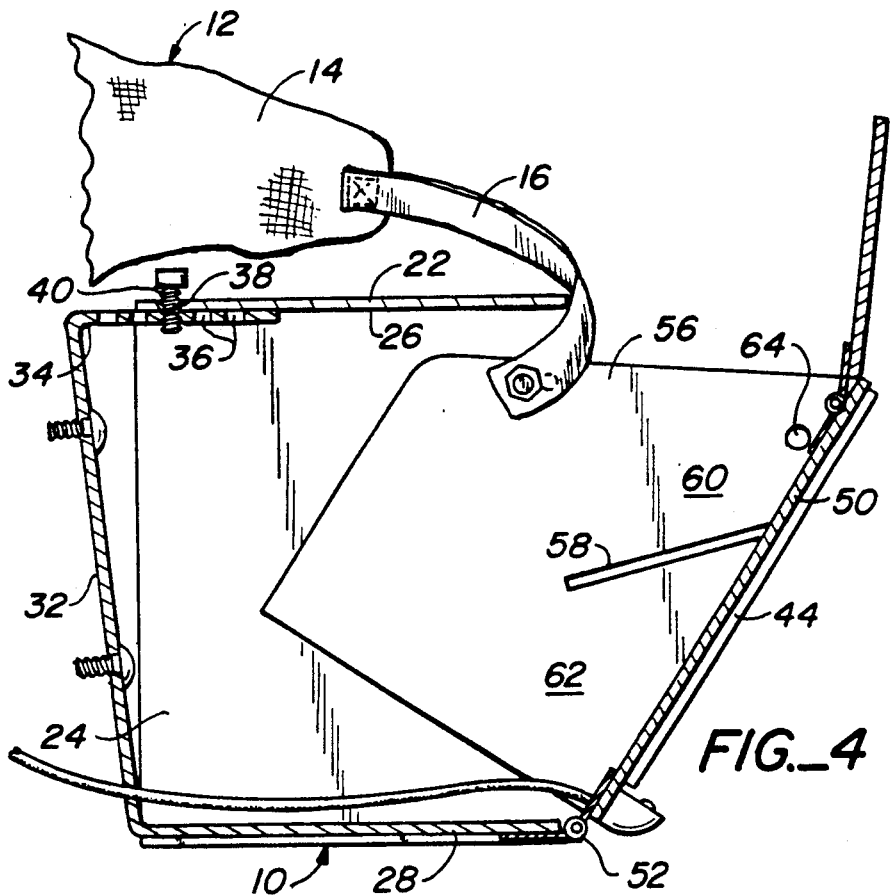
FIG._4
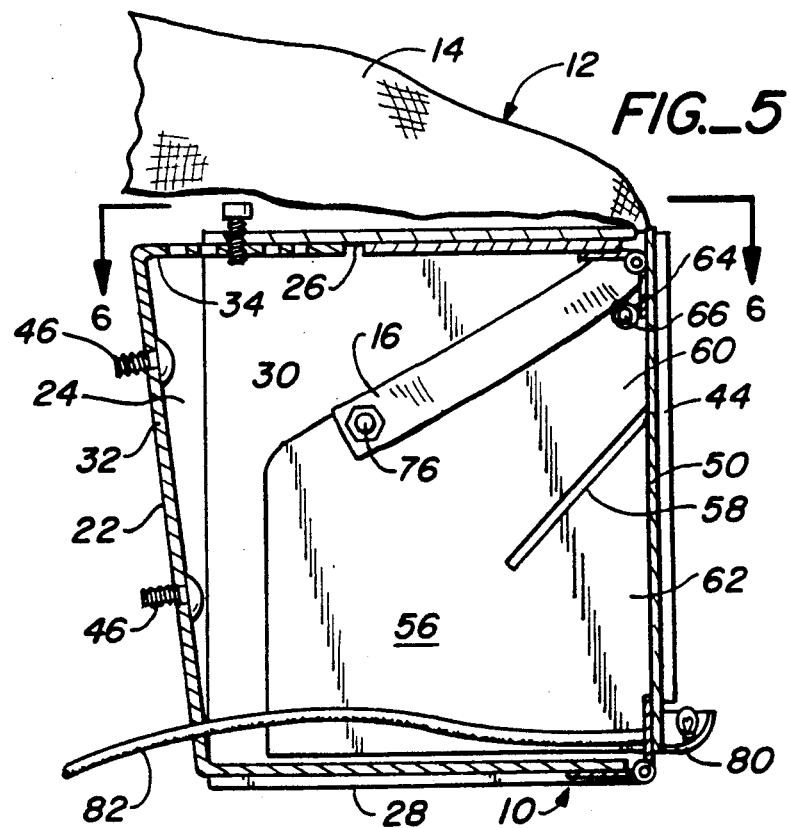
FIG._5

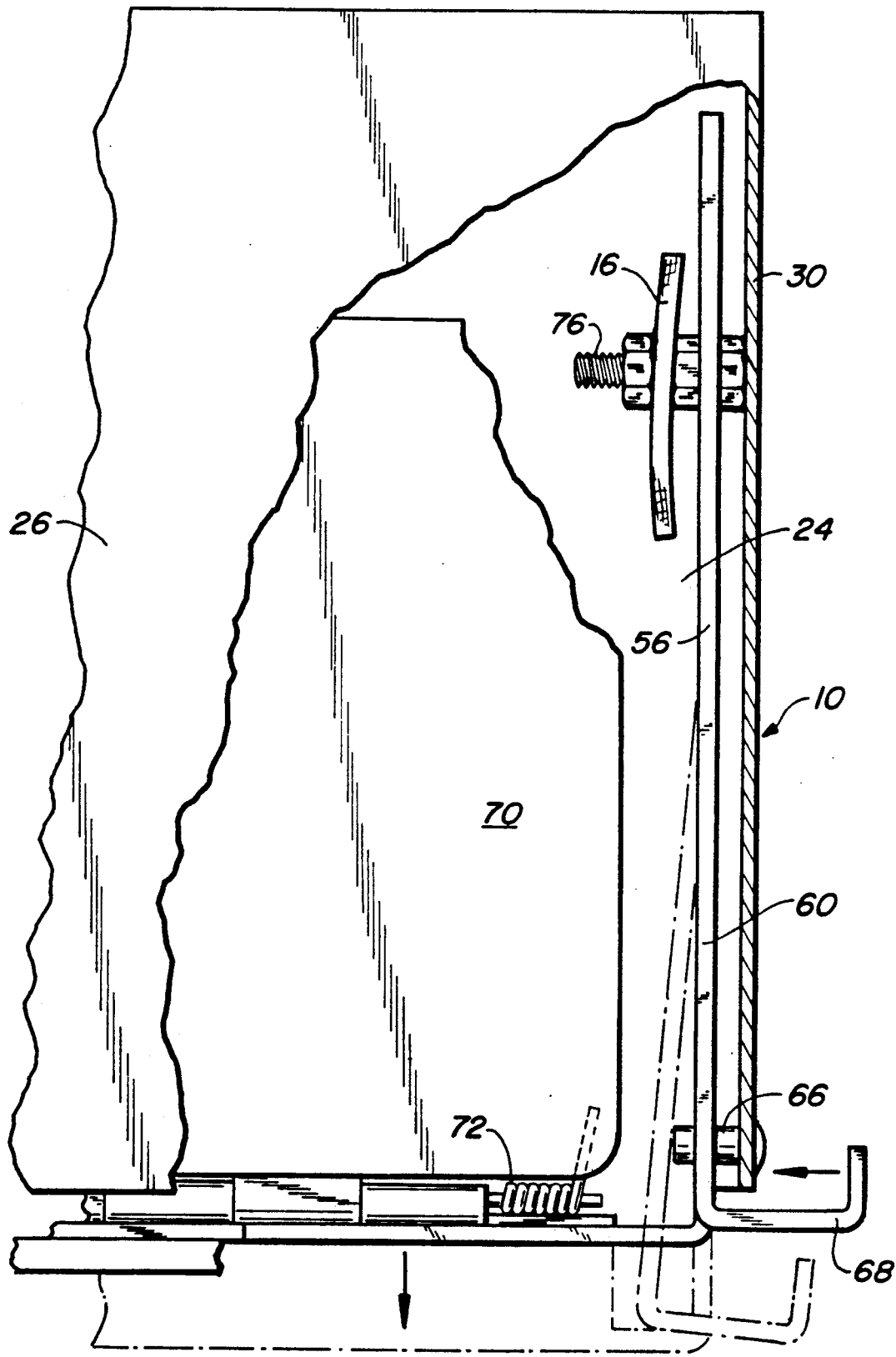
FIG._6

5,088,788

VEHICLE COVER APPARATUS

TECHNICAL FIELD

This invention relates to vehicle cover apparatus including a cover for covering the vehicle and storage means attached to the vehicle for storing the cover when the cover is not in use.

BACKGROUND ART

It is well known to cover vehicles with sheets of fabric and the like to protect the vehicles from the elements. It is also generally known to affix a housing to a vehicle to store the cover when it is not being utilized. Representative devices of this type are disclosed in the following patents: U.S. Pat. No. 4,856,842, issued Aug. 15, 1989 to Ross et al, U.S. Pat. No. 1,719,055, issued July 2, 1929 to Herzer, U.S. Pat. No. 1,918,423, issued July 18, 1933 to Persinger, U.S. Pat. No. 4,732,421, issued Mar. 22, 1988 to Ross et al, and U.S. Pat. No. 2,688,513, issued Sept. 7, 1954 to Poirier.

U.S. Pat. No. 4,570,986, issued Feb. 18, 1986 to Sams and U.S. Pat. No. 4,674,782, issued June 23, 1987 to Helber disclose vehicle bumper assemblies forming one or more compartments which may be utilized to store a variety of items including, presumably, a cover for the vehicle with which the storage bumpers are employed.

U.S. Pat. No. 4,171,145 issued Oct. 16, 1979 to Pearson, Sr. discloses a retractable protective covering which may be unrolled from a spring loaded spool mounted in a housing attached to a motorcycle to cover the seat and the tank of the motorcycle.

DISCLOSURE OF THE INVENTION

Apparatus constructed in accordance with the teachings of the present invention has certain characteristics in common with the prior art noted above in that it includes a cover for covering a vehicle as well as storage means for attachment to the vehicle for storing the cover when it is not in use. However, the present invention incorporates a cover and storage means of a type which cooperate to tighten the cover in position on the vehicle when it is covering same. Furthermore, the storage means and cover are so constructed as to deter against theft of the cover whether in use or in storage and interface with conventional mounts provided on all vehicles for attaching license plates. This latter feature provides ease of installation and presents a pleasing appearance after installation.

The vehicle cover apparatus of the present invention includes a cover for covering the vehicle and storage means for attachment to the vehicle and for storing the cover when the cover is not covering the vehicle. The storage means includes housing means defining an interior for accommodating the cover during storage and securement means cooperable with the cover when the cover covers the vehicle to tighten the cover relative to the vehicle.

The securement means includes closure means connected to the housing means and movable relative thereto between a first position wherein the interior is substantially closed and a second position wherein the interior is open. The cover is connected to the closure means and the closure means exerts a pulling force on the cover when the closure means moves from the second position to the first position to tighten the cover relative to the vehicle.

The cover includes a sheet of flexible material and at least one strap connected to the sheet of flexible material. The apparatus additionally comprises attachment means for attaching the strap to the closure means, the closure means operable to pull the strap into the housing means interior when the closure means moves from the second position to the first position.

The closure means includes a closure flap pivotally secured to the housing means and at least one extension element attached to and extending from the closure flap. The extension element is positioned within the housing means interior when the closure means is in the first position, the attachment means connecting a strap to the extension element.

The closure means additionally includes a tucker flap connected to the closure flap for engaging the cover after the cover has been removed from covering the vehicle and positioned in the housing means.

Other features, advantages, and objects of the present invention will become apparent with reference to the following description and accompanying drawings.

BRIEF DESCRIPTION OF DRAWINGS

FIG. 1 is a perspective, exploded view of a vehicle and apparatus constructed in accordance with the teachings of the present invention prior to application thereof to the vehicle;

FIG. 2 is a perspective view illustrating the vehicle cover apparatus of the present invention applied to the vehicle with the cover thereof covering the vehicle;

FIG. 2A is a somewhat diagrammatic, plan view illustrating the cooperative relationship between the apparatus cover and storage means;

FIG. 3 is an enlarged, side view of the apparatus illustrating the relative positions assumed by the structural components thereof when the cover is being inserted into the interior of the storage means;

FIGS. 4 and 5 are cross-sectional, side views illustrating details of the apparatus and cooperative relationship between the components thereof when the cover is removed from the storage means and is employed to cover the vehicle; and FIG. 6 is a greatly enlarged, partial, sectional view taken along the line 6—6 in FIG. 5.

BEST MODE FOR CARRYING OUT THE INVENTION

Referring now to the drawings, the apparatus constructed in accordance with the teachings of the present invention is designated by reference numeral 10. Apparatus 10 includes a cover 12 including a sheet 14 of canvas, plastic or any other suitable flexible material and a plurality of straps 16 connected to the sheet. Straps 16 may also be constructed of any suitable flexible material such as canvas or the like.

Apparatus 10 also includes storage means for attachment to the vehicle, a representative vehicle being designated by reference numeral 18 in the drawings. The storage means includes a housing 22 defining an interior 24 within which the cover 12 is stored when not in use. Housing 22 has a generally box-like configuration and comprises a plurality of interconnected walls including a top wall 26 and a bottom wall 28. The housing also includes opposed side walls 30 as well as a back wall 32.

As may perhaps best be seen with reference to FIGS. 3, 4 and 5, a flange 34 is integral with the back wall 32 and extends generally at right angles thereto. Flange 34 has a plurality of spaced apertures 36 formed therein.

Apertures 36 are for the purpose of being selectively brought into registry with an aperture 38 formed in top wall 26. A screw fastener 40 is then screwed into the aligned apertures 36, 38 to retain the back wall 32 at a desired degree of inclination.

The housing 22 is of a size and configuration to be positioned in the license plate mounting well 43 of vehicle 18. The license plate 44, of course, having been previously removed therefrom. Screws 46, are employed to secure the housing to the vehicle, the screws being in alignment with holes (not shown) formed in the vehicle.

It may be desirable to have the top and bottom walls of the housing generally horizontal when the housing is disposed on the vehicle as well as allow the user to accommodate various license plate attachment configurations and the above-described adjustability of back wall 32 will compensate for the angle of inclination of the license plate mounting well 42. Of course, in some cases, the mounting well will be completely vertical, in which event the back wall 32 will be set at right angles to the top wall 26 and bottom wall 28.

A closure flap 50 is connected at the lower end thereof by a hinge 52 to the distal end of bottom wall 28. The closure flap 50 is movable from a first position (illustrated in FIGS. 5 and 6) wherein the interior 24 is substantially closed and a second position (shown in FIGS. 3 and 4) wherein the interior is open.

Extending into the interior 24 of the housing from opposed sides of the closure flap 50 are extension elements 56, said extension elements being of identical construction. Each extension element 56 is of planar form, being formed of sheet metal or the like. A slit 58 divides each of the extension elements into an upper section 60 and a lower section 62. Extension element lower section 62 is fixedly connected to closure flap 50 while the upper section 60 is movable relative to both the lower section 62 and the closure flap.

An aperture 64 is formed in each upper section 60. When the closure flap 50 is in its first position, i.e. closed position, the apertures 64 each receive a boss 66. A boss 66 extends inwardly from each of the side walls and when the apertures 64 receive the bosses 66 the closure flap is maintained in its first or closed position. Each of the extension element upper sections 60 have a handle 68 formed integrally therewith and projecting outwardly therefrom as shown in FIG. 6, the handles enabling the operator to flex the upper sections 60 relative to the lower sections to withdraw the apertures 64 away from bosses 66 and permit opening of the closure flap, i.e. movement of the closure flap to its second position. FIG. 6 provides a phantom line presentation illustrating such flexing operation.

Hingedly mounted on the top of closure flap 50 is a tucker flap 70. A coil spring 72 is located at the hinge interconnecting tucker flap 70 to closure flap 50, said spring continually urging the tucker flap toward the position indicated in phantom line in FIG. 3. That is, when the cover flap 50 is open, the tucker flap is directed away from the top wall to define a space therebetween in communication with the housing interior. When, however, the closure flap 50 is in its first or closed position, the tucker flap will be continually urged by the coil spring 72 against top wall 26. It will be appreciated that the operator must manually pivot the tucker flap relative to the closure flap 50 against the urging of coil spring 72 when he or she wishes it to assume a position enabling the tucker flap to enter the housing interior.

The tucker flap serves a useful purpose. When the operator wishes to store the cover 12 within the interior of the housing he or she stuffs the cover between extension elements 56 and into the housing interior, the closure flap 50 of course being in its open or second position when this operation takes place. The tucker flap is then pushed downwardly against the cover and the closure flap 50 is pushed closed. This ensures that cover 12 does not interfere with closure of the closure flap. The closure flap 50, extension elements 56 and tucker flap 70 form a closed bin for at least a portion of the cover during storage thereof to ensure proper placement of the cover within the interior. The tucker flap also provides a right angle brace for the closure flap to prevent bending of the closure flap.

A fastener 76 in the form of a nut and bolt assembly is associated with each extension element 56. Preferably, each fastener 76 is so positioned relative to its associated extension element that it will engage a boss 66 as the closure flap is opened to ensure that the closure flap does not move beyond the second position. However, the operator may fully open the closure flap, if desired, by manually manipulating the extension element to allow passage of fasteners 76 past the bosses 66. Each fastener 76 connects at least one strap 16 to an extension element. When the closure flap 50 is moved from its open or second position to its first or closed position, each fastener 76 will move further into the interior 24 of housing 22. This action exerts a pulling force on the straps which serves to pull the straps into the housing interior and thus tighten the cover relative to the vehicle. When the closure flap 50 is closed most, if not all, of the straps 16 will be within the housing interior and either the straps or a portion of the sheet of flexible material also comprising part of the cover will be located in the nip formed between the housing top wall 26 and the closure flap 50. This is shown in FIG. 5.

With the cover and housing and closure flap assuming the relative positions shown in FIG. 5, the cover is secured to the vehicle. Not only is the cover sheet of flexible material tightened about the vehicle 18, theft of the cover is significantly deterred since a would-be thief is forced to cut or damage the cover to remove it. It is preferred that a conventional key lock or other suitable lock arrangement be employed to hold the closure flap 50 in its closed or first position. Such a lock arrangement has not been disclosed since such devices are well known and it is readily within the ability of a person skilled in the art to incorporate such a lock on apparatus 10 if so desired. A suitable alarm could be incorporated on the apparatus also.

The outwardly disposed planar surface of closure flap 50 functions as a mount for vehicle license plate 44, it of course being understood that screws or other suitable fasteners (not shown) are used to secure the license plate to the closure flap.

A light fixture 80 is preferably secured to the bottom of the closure flap 50. An electrical wire 82 extends from the light fixture through the interior of the housing to a location where it may be incorporated with the vehicle's electrical system to provide illumination for the license plate. The light fixture may also be secured to or a part of a license plate frame which is an expedient commonly utilized in automobiles.

I claim:

1. Vehicle cover apparatus, said apparatus comprising, in combination:

a cover for covering said vehicle; and storage means for attachment to said vehicle and for storing said cover when said cover is not covering said vehicle, said storage means including housing means defining an interior for accommodating said cover during storage and securement means cooperable with said cover when said cover covers said vehicle to tighten said cover relative to said vehicle, said securement means includes closure means connected to said housing means and movable relative thereto between a first position wherein the interior is substantially closed and a second position wherein interior is open, said cover being connected to said closure means and said closure means exerting a pulling force on said cover when said closure means moves from said second position to said first position to tighten said cover relative to said vehicle.

2. The apparatus according to claim 1 wherein said cover includes a sheet of flexible material and at least one strap connected to said sheet of flexible material, said apparatus additionally comprising attachment means for attaching said at least one strap to said closure- means, said closure means operable to pull said at least one strap into said housing means interior when said closure means moves from said second position to said first position.

3. The apparatus according to claim 2 wherein said closure means includes a closure flap pivotally secured to said housing means and at least one extension element connected to and extending from said closure flap, said extension element being positioned within said housing means interior when said closure means is in said first position, said attachment means connecting a strap to said extension element.

4. The apparatus according to claim 3 wherein said closure means additionally includes a tucker flap connected to said closure flap for engaging said cover after said cover has been removed from covering said vehicle and positioned in said housing means.

5. The apparatus according to claim 4 wherein said tucker flap is pivotally connected to said closure flap, said housing means including a top wall, and said apparatus additionally comprising biasing means biasing said tucker flap against said top wall when said closure means is in said first position.

6. The apparatus according to claim 5 wherein said biasing means is operable to move said tucker flap away from said housing means top wall when said closure means is in said second position to define a space therebetween in communication with said housing interior to allow manual access to said housing interior.

7. Vehicle cover apparatus, said apparatus comprising, in combination:

a cover for covering said vehicle; and storage means for attachment to said vehicle and for storing said cover when said cover is not covering said vehicle, said storage means including housing means defining an interior for accommodating said cover during storage and securement means cooperable with said cover when said cover covers said vehicle to tighten said cover relative to said vehicle, said housing means including a back wall for attachment to said vehicle, said apparatus further comprising adjustment means for adjusting the position of said back wall relative to the remainder of said housing means.

8. The apparatus according to claim 3 wherein said closure flap defines an outer surface for attachment of a vehicle license plate thereto, said apparatus further comprising a light fixture for illuminating a vehicle license plate attached to said closure flap outer surface.

9. The apparatus according to claim 7 wherein said back wall is adjustably pivotally connected to the remainder of said housing means, said adjustment means including means for retaining said back wall in a preselected one of a plurality of inclinations.

10. The apparatus according to claim 1 additionally comprising manually actuatable latch means for selectively latching said closure means in said first position.

11. The apparatus according to claim 1 wherein said closure means and said housing cooperate to grip said cover therebetween when said cover covers said vehicle and said closure means is in said first position.

* * * * *